Patented Jan. 15, 1935

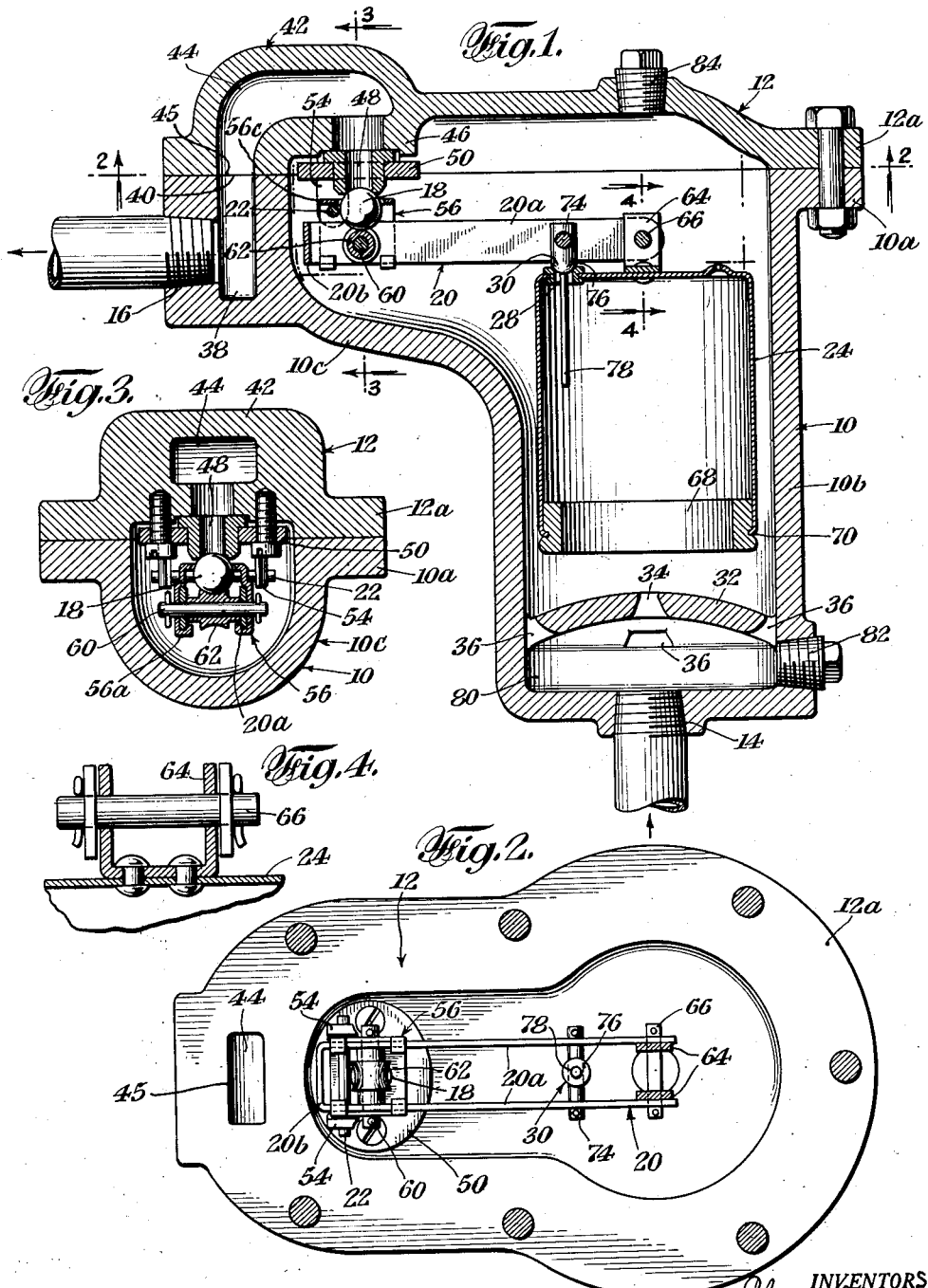

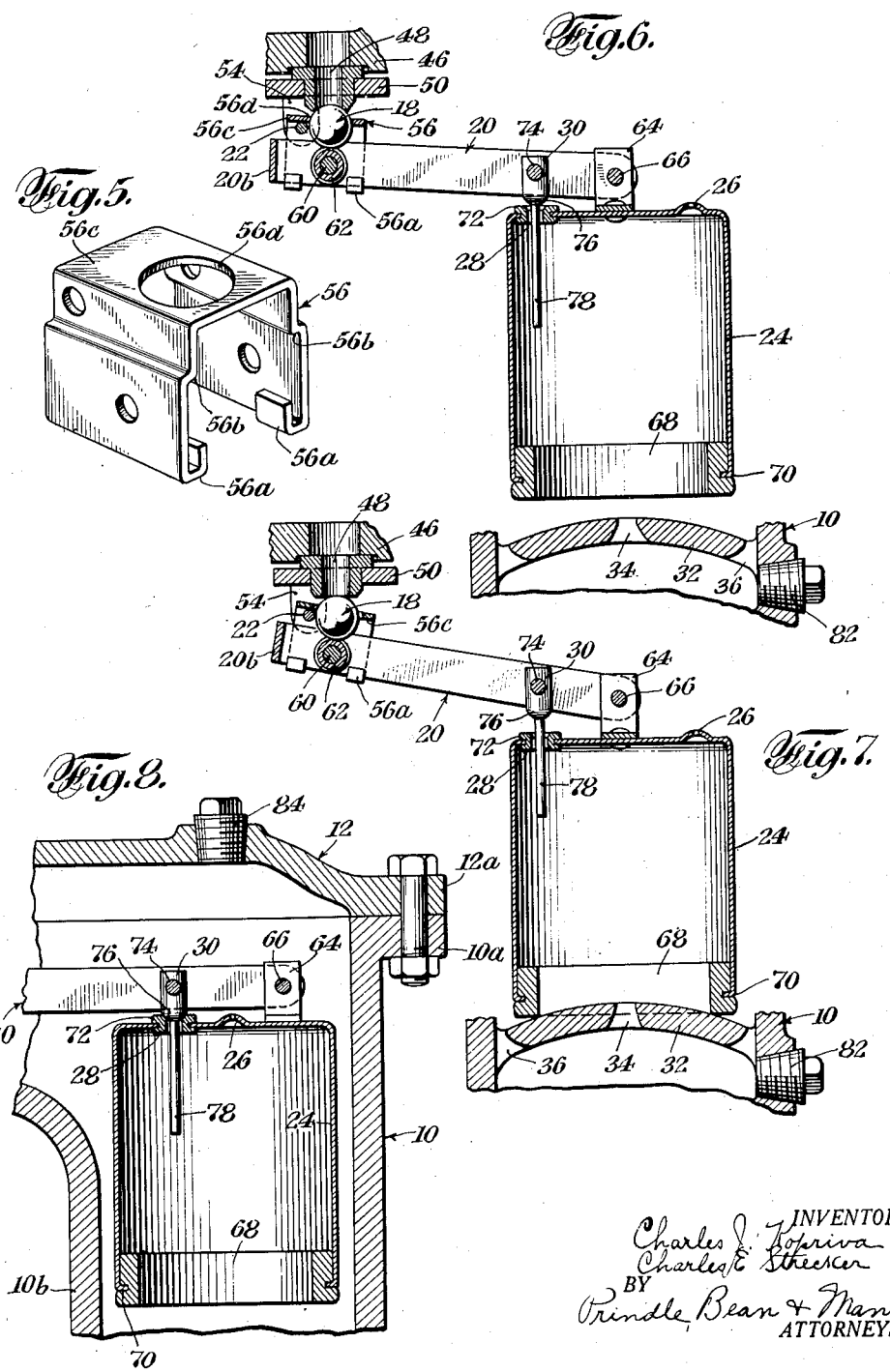

1,988,127

UNITED STATES PATENT OFFICE 1,988,127

STEAM TRAP

Charles J. Kopriva, Bloomfield, and Charles E. Strecker, North Arlington, N. J., assignors to Eastwood-Nealley Corporation, Belleville, N. J., a corporation of New Jersey Application June 10, 1933, Serial No. 675,160

17 Claims. (Cl. 137—103)

Our present invention relates to an improved steam trap which is adapted to be embodied in a simple, rugged construction which is positive and effective in operation and not likely to get out of order.

To the accomplishment of the foregoing and such other objects as may hereinafter appear, this invention consists in the construction, combination and arrangement of parts hereinafter described and then sought to be defined in the appended claims, reference being had to the accompanying drawings forming a part hereof, and which show for the purpose of illustrative disclosure, but without limiting the invention to all the details thereof, a preferred embodiment of our invention with modifications, it being expressly understood that various changes may be made in practice within the scope of the claims without digressing from our inventive idea.

In the drawings:—

Fig. 1 is a vertical, longitudinal section partly in elevation through a steam trap within our invention;

Fig. 2 is an underneath view of the cover and some of the supported operative members, partly in section, on the line 2—2 of Fig. 1 looking upwardly;

Fig. 3 is a transverse sectional view partly in elevation on the line 3—3 in Fig. 1, looking in the direction of the arrows;

Fig. 4 is a sectional view of a detail on a larger scale on the line 4—4 in Fig. 1 looking in the direction of the arrows;

Fig. 5 is a perspective view on a larger scale of the so-called cage 56 detached from the lever;

Figs. 6 and 7 are partial views corresponding in part to Fig. 1 but showing the parts in different operative positions, and Fig. 8 is a fragment of a steam trap showing a modification, said steam-trap as to unillustrated parts being supposed to be the same as the steam trap shown in Fig. 1.

In brief statement, the illustrated steam trap within our invention comprises a hollow body part 10 and cover 12 with inlet 14 and outlet 16. It further comprises a valve 18 for controlling the outlet operatively supported by the lever 20 pivoted to the underside of the cover on the pin 22 for hinging movement in a vertical plane, said lever supporting an inverted bucket 24 pivotally depending from its free end. This bucket has a permanently open small vent 26 and a port 28 controlled by a valve 30 pivotally depending from a middle portion of the lever.

A baffle plate 32 is located horizontally across the hollow body part of the trap somewhat above the bottom thereof, this plate being upwardly coned and further being centrally apertured as well as peripherally apertured or spaced from the wall of the body part 10. The central aperture 34 is vertically over the inlet 14 and in turn delivers up into the open mouth of the inverted bucket 24. On the other hand the peripheral apertures 36 lead upwardly towards the space between the bucket and the casing 10 of the trap.

More in detail, the body part 10 is open at the top and surrounded by a flange 10a. The cover 12 has a corresponding flange 12a by which it is adapted to be bolted or otherwise detachably secured to the body part. The cover 12 is hollowed out with a recess whose mouth registers in shape and location with the mouth of the chamber in the body part. A gasket not shown may be interposed between these flanges to make the joint water and steam tight.

In side elevation and corresponding vertical section, the hollow body part 10 may be elbow shaped as shown. Stated differently it consists of a vertical cylindrical portion 10b having a lateral extension 10c at its upper end. Through the bottom of this vertical portion is the screw threaded inlet hole 14 for connecting the trap to the steam line. The outlet 16 of the trap is a screw-threaded hole leading from a chamber 38 formed in the end of the lateral extension 10c, this chamber having two openings connected therewith, one the above referred to outlet 16 of the trap, and the other a vertical port 40 through the flange 10a. The previously described cover 12 has a boss 42 in which there is an inverted U-shaped passage 44. One leg of this passage opens downwardly through the flange 12a of the cover by a port 45 which registers with the aforesaid port 40 in the body part. The other leg of the U-shaped passage connects with the hollow interior of the trap with its mouth at the underside of an internal shoulder 46 in the cover.

A flanged bushing 48 is clamped by a plate 50 against this shoulder with the bore of the bushing and the mouth of the U-passage registering with each other. The flange of the bushing is engaged and clamped by this plate 50 against the aforesaid internal shoulder 46 of the cover by taking up on the screws 52 which connect the plate and the cover. The bushing proper projects through a hole in the clamping plate with its mouth forming a circular seat for the ball valve 18. A packing washer not shown may be interposed between the shoulder and the bushing.

The aforesaid clamping plate 50 has two spaced apart lugs 54 hanging down integrally from its underside. These lugs are apertured to support the pivot pin 22 for the lever 20, said pin extending horizontally and transversely relatively to the cover and the body part of the trap when the cover is in place.

The pivoted or basal end of the lever 20 has an upward extension, designated generally 56, by which it is pivoted to this pin 22. This upward extension is in effect a hollow cage serving to contain and operatively support the ball valve. In actuality, the illustrated lever 20 and this upward extension 56 consists of the following:—the lever is U-shaped in plan view and may be bent up from a strip of sheet metal. Thus the lever has two parallel, spaced apart arms 20a with an integral connecting portion 20b at one end, preferably at the basal end of the lever as shown.

Specifically the referred to upward extension 56 consists of an inverted, square-shouldered, U-shaped, sheet metal piece. The lower portion of the legs of this piece straddle the arms of the lever and are clamped thereto by and between the lugs 56a and the shoulders 56b integral with said legs. A pin 60 headed or upset or having cotter-pins at its ends passes through both lever arms 20a and both legs of the piece 56 and serves to complete the rigid mounting of the piece 56 on the basal end of the lever; and further serves as a supporting axle for the freely rotatable roller 62. The upper portions of the legs of the U-shaped piece, namely the portions thereof which are nearest the cross web or bridge 56c thereof and which are above the lever arms 20a are apertured with alined holes through which the pivot pin 22 for the lever 20 freely projects, this being the heretofore described pin supported by the lugs 54 of the clamping plate 50 for the pivotal support and fulcrum of the lever.

The aforesaid bridge portion 56c of the U-shaped piece 56 being in effect the top of a cage 56 is apertured with a circular hole 56d in substantial axial alinement with the mouth of the bushing 48 when the lever 20 is in its up position.

This cage 56 houses the ball-valve 18 with the ball upheld at the bottom on the previously described roller 62 which is suitably concaved to fit the ball. At the top the ball can project sufficiently through the hole 56d to coact operatively as a valve with the mouth of the bushing 48.

The ball 18 is loosely held in the described cage or setting 56 so as to be freely rotatable in every direction. Moreover, preferably there is sufficient vertical play for the ball between the roller 62 and the apertured top of the cage so that the ball can remain seated against the mouth of the bushing 48 and yet the lever 20 and the cage 56 can pivot downwardly through a small angle which is nevertheless sufficient to lift the bucket valve 30 off its port 28 and thereby vent the bucket before the apertured top of the cage engages the ball and pulls it off its seat.

Preferably the fulcrum 22 of the lever and the center portion of the ball 18 and the pivotal suspension of the bucket 24 are positioned as shown relatively to one another so that each time the lever rises and seats the ball, the latter first contacts with only one side of its port before it contacts all round, whereby a partial rotation is given the ball each time, so that any wear is distributed evenly over its surface. This free rotation of the ball is permitted and encouraged by its being supported at the bottom on the freely rotatable concave roller 62 previously referred to.

The pivotal connection between the lever 20 and the bucket 24 consists of a U- or otherwise shaped lug 64 riveted to the top of the bucket with its legs loosely straddled by the arms of the lever. A pivot pin 66 passes through the parts so that the bucket is pivotally suspended from the lever arms. The pin is conveniently retained in place by being fitted with cotter pins at its ends.

The bucket 24 which may be spun up out of sheet metal, is strengthened and stiffened at its mouth by an internal ring 68 having an annular groove into which the rim of the bucket is forced or spun as shown at 70. This stiffening ring is formed with a projecting annular bead at its lower corner and acts as a ballast. It also acts as a buffer for the bucket whenever it vibrates into contact with the inside of the steam trap.

The valve controlled port 28 of the illustrated bucket consists of the mouth of a flanged bushing 72 which is applied to a circular hole in the top of the bucket and then crimped like an eyelet in the hole. The valve 30 for this port is located between the arms of the lever 20 pivoted on a pin 74 supported by said arms. It has a hemispherical or rounded lower end 76 adapted when seated to close the port. The valve has a depending tail piece 78 long enough always to remain in the bushed hole regardless of the raising and lowering of the lever and bucket so that the seating portion 76 of the valve is always directed toward its seat or port and cannot become displaced to render the valve inoperative.

Fig. 6 shows the lever 20 pivoted to the center of the top of the cylindrical bucket 24 with the valve 30 and its port 28 located near the side of the bucket towards the fulcrum of the lever.

Another form is shown diagrammatically in Fig. 8 wherein the lever 20, extending diametrically across the top of the bucket, is pivoted to the bucket toward its side furthest away from the fulcrum of the lever. In this latter form, the valve 30 and its port in the top of the bucket may be located anywhere on the bucket along the line of the lever and will be preferably located at or near the side of the bucket towards the fulcrum of the lever.

In both constructions, the object is to provide sufficient spacing between the valve 30 and the pivotal suspension 66 of the bucket so that the first slight lowering of the bucket and lever from their fully up position will cause the lever to lift the valve 30 and vent its port 28 and thereby cause the bucket to lose its buoyancy due to entrapped steam and to sink. The valve 30 is closed only when the bucket and lever are in their fully up position. At all other times this valve is open including the time when the bucket is fully down adjacent to or resting upon the baffle plate 32 forming the roof of the inlet chamber 80.

This centrally and laterally apertured conical roof 32 of the inlet chamber 80 or equivalent baffle construction has the distinct advantage of tending to segregate the steam so that it tends to pass up primarily through the central aperture 34 at the top of the cone into the bucket, whereas the water tends to pass up through the peripheral spaces 36.

The operation of the steam trap as a whole is as follows. Assuming that the lever 20 and the bucket 24 are down, the valves 18 and 30 will be open. This will be the condition when the steam line is more or less cold with the condensate and air that is being delivered into the trap, filling it and exiting past the valve 18 and out of the trap by the passage 44 and the outlet 16. At this time there is nothing to make the bucket rise, the bucket-valve port 28 being wide open and allowing free escape of air from the bucket. The result is that there is full and free opportunity for the trap to deliver and get rid of the air and condensate from the line. Fig. 7 shows this condition of the trap and the described relation of the operating parts.

The condition changes as soon as steam reaches the trap and passes up through the baffle aperture 34 in sufficient quantity to raise the bucket despite the port 28 being open, whereupon the bucket and lever will rise to their fully up position shown in Fig. 1 with the ball-valve 18 sealing the outlet and preventing further escape and waste of live steam.

When subsequently condensation begins, the bucket being no longer buoyed up by sufficient steam to make good the loss from the permanent vent 26, starts to descend along with the lever 20 and in doing so, the lever during the very first part of the descent unseats the bucket-valve 30 as shown in Fig. 6 thereby quickly venting the remaining steam in the bucket so that the bucket loses its buoyancy and sinks under its own weight and the weight of the lever towards its fully lowered position Fig. 7. The lever 20 meanwhile pulls the ball valve 18 off its seat and vents the trap.

The vertical play heretofore described which the valve 18 has relatively to the lever 20, leaves the lever and the bucket initially free to descend as just described from their fully up position unimpeded by the valve 18 which initially for the time being is firmly pressed and upheld by the steam against its port in the bushing 48. This free and unimpeded initial descent of the lever and bucket is sufficient for the lever to operate the bucket valve 30 to vent the bucket so that the bucket and lever continue to descend with the result that the main valve 18 is then pulled off its seat by the apertured top of the cage 56 contacting with the ball and carrying it down along with the cage and the lever.

The trap is simple in construction; positive and effective in operation; and not likely to get out of order.

The screw-plugs 82 and 84 enable the trap to be cleaned or drained of sediments and deposits and otherwise manipulated and adjusted without taking it apart. The cover 12 is removable without disturbing the inlet and outlet pipe connections which are solely with the body part 10 of the trap.

In the foregoing we have conveniently called our device a steam trap and have described it as such because this is an important use of the device, but it is also useable as a trap for or with ammonia, sulphur dioxide, alcohol and like gases and vapors; and the appended claims are intended to cover these and all other uses.

What we claim is:

1. A trap comprising a hollow casing having an inlet and an outlet, a lever fulcrumed in the casing, a valve carried by said lever controlling the outlet, an inverted bucket pivotally suspended by its top from the lever with its mouth over the inlet, the bucket having a small permanent vent, and a second valve carried by the lever controlling a port in the top of the bucket, said second valve and port being distantly spaced from the suspension of the bucket, and being arranged to close said port only when the bucket and lever are in their up position wherein they have carried the outlet valve into closing position against the outlet.

2. A trap as claimed in claim 1, further characterized by the first mentioned valve having play relatively to the lever whereby the bucket can descend from its said up position for a certain distance and carry the lever freely with it unimpeded by said valve although steam or fluid pressed against the outlet.

3. A trap as claimed in claim 1, further characterized by the bucket being suspended from the free end of the lever, and by the aforesaid second valve being supported by the lever over said port away from the suspension of the bucket and towards the fulcrum of the lever.

4. A trap as claimed in claim 1, further characterized by the bucket being suspended by its central top portion from the free end of the lever, and by the aforesaid second valve being supported by the lever over said port away from the suspension of the bucket and towards the fulcrum of the lever.

5. A trap as claimed in claim 1 further characterized by the bucket being suspended eccentrically towards the side away from the fulcrum of the lever, and by the aforesaid second valve being supported by the lever over said port away from the suspension of the bucket and towards the fulcrum of the lever.

6. A trap as claimed in claim 1 further characterized by the valve for the port in the bucket having a tail piece projecting freely through said port.

7. A trap as claimed in claim 1 further characterized by there being a baffle located between the inlet and the mouth of the bucket, said baffle being upwardly funneled to an aperture located under the mouth of the bucket, there being passages at the outer periphery of the baffle towards the space between the casing and the bucket.

8. A trap as claimed in claim 1 further characterized by the first mentioned valve having play relatively to the lever, whereby the bucket can descend from its said up position for a certain distance and carry the lever freely with it unimpeded by said valve although steam or fluid pressed against the outlet, the bucket being suspended from the free end of the lever, and the aforesaid second valve being supported by the lever over said port away from the bucket suspension and towards the fulcrum of the lever.

9. A trap as claimed in claim 1 further characterized by the first mentioned valve having play relatively to the lever, whereby the bucket can descend from its said up position for a certain distance and carry the lever freely with it unimpeded by said valve although steam or fluid pressed against the outlet, the bucket being suspended by its central top portion from the free end of the lever, and the aforesaid second valve being supported by the lever over said port away from the suspension of the bucket and towards the fulcrum of the lever.

10. A trap as claimed in claim 1 further characterized by the first mentioned valve having play relatively to the lever, whereby the bucket can descend from its said up position for a certain distance and carry the lever freely with it unimpeded by said valve although steam or fluid pressed against the outlet, the bucket being suspended eccentrically towards the side away from the fulcrum of the lever, and the aforesaid second valve being supported by said port away from the suspension of the bucket and towards the fulcrum of the lever.

11. A trap as claimed in claim 1 further characterized by the outlet valve having play relatively to the lever, whereby the bucket can descend from its said up position for a certain distance and carry the lever freely with it unimpeded by the outlet valve although steam or fluid pressed against the outlet, and further characterized by there being a baffle located between the inlet and the mouth of the bucket, said baffle being upwardly funneled to an aperture located under the mouth of the bucket, there being passages at the outer periphery of the baffle towards the space between the casing and the bucket.

12. A trap as claimed in claim 1 further characterized by the first mentioned valve having play relatively to the lever, whereby the bucket can descend from its said up position for a certain distance and carry the lever freely with it unimpeded by said valve although steam or fluid pressed against the outlet, the bucket being suspended from the free end of the lever, and the aforesaid second valve being supported by the lever over said port away from the bucket suspension and towards the fulcrum of the lever; and being further characterized by there being a baffle located between the inlet and the mouth of the bucket, said baffle being upwardly funneled to an aperture located under the mouth of the bucket, there being passages at the outer periphery of the baffle towards the space between the casing and the bucket.

13. A trap as claimed in claim 1 further characterized by the first mentioned valve having play relatively to the lever, whereby the bucket can descend from its said up position for a certain distance and carry the lever freely with it unimpeded by said valve although steam or fluid pressed against the outlet, the bucket being suspended by its central top portion from the free end of the lever, and the aforesaid second valve being supported by the lever over said port away from the suspension of the bucket and towards the fulcrum of the lever; and being further characterized by there being a baffle located between the inlet and the mouth of the bucket, said baffle being upwardly funneled to an aperture located under the mouth of the bucket there being passages at the outer periphery of the baffle towards the space between the casing and the bucket.

14. A trap as claimed in claim 1 further characterized by the first mentioned valve having play relatively to the lever, whereby the bucket can descend from its said up position for a certain distance and carry the lever freely with it unimpeded by said valve although steam or fluid pressed against the outlet, the bucket being suspended eccentrically towards the side away from the fulcrum of the lever, and the aforesaid second valve being supported by the lever over said port away from the suspension of the bucket and towards the fulcrum of the lever; and being further characterized by there being a baffle located between the inlet and the mouth of the bucket, said baffle being upwardly funneled to an aperture located under the mouth of the bucket, there being passages at the outer periphery of the baffle towards the space between the casing and the bucket.

15. A trap comprising a hollow casing having an inlet and an outlet, a lever fulcrumed in the casing, a valve controlling said outlet operated by the lever, an inverted bucket pivotally suspended from the lever, with its mouth over the inlet, the bucket being vented by a permanently open small vent, a second valve controlling a port in the bucket, the lever comprising spaced apart parallel arms side by side pivoted to a bracket secured to the upper portion of the bucket, and the aforesaid second valve being pivotally suspended from between said arms.

16. A trap comprising a hollow casing having an inlet and an outlet, a lever fulcrumed in the casing, a valve controlling said outlet operated by the lever, an inverted bucket pivotally suspended from the lever with its mouth over the inlet, the bucket being vented by a permanently open small vent, a second valve controlling a port in the bucket, the first mentioned valve being a ball supported in a cage on the lever permitting the ball to have play relatively to the lever in the direction of its motion towards and away from the outlet valve seat.

17. A trap comprising a hollow casing having an inlet and an outlet, a lever fulcrumed in the casing, a valve controlling said outlet operated by the lever, an inverted bucket pivotally suspended from the lever with its mouth over the inlet, the bucket being vented by a permanently open small vent, a second valve controlling a port in the bucket, the first mentioned valve being a freely rotatable ball contained in a cage on the lever, the ball projecting through an aperture in the cage to engage its seat and being supported on a freely turning roller.

CHAS. J. KOPRIVA.
CHARLES E. STRECKER.